United States Patent
Kimura et al.

(10) Patent No.: US 6,710,119 B2
(45) Date of Patent: Mar. 23, 2004

(54) ROOM TEMPERATURE RAPID CURING ORGANOPOLYSILOXANE COMPOSITION

(75) Inventors: Tsuneo Kimura, Annaka (JP); Mamoru Teshigawara, Tomioka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 23 days.

(21) Appl. No.: 10/141,975

(22) Filed: May 10, 2002

(65) Prior Publication Data

US 2003/0065077 A1 Apr. 3, 2003

(30) Foreign Application Priority Data

May 11, 2001 (JP) .......................... 2001-141766

(51) Int. Cl.$^7$ .............. C08L 83/06; C08R 3/10; C08R 3/20; C08R 3/26
(52) U.S. Cl. .............. 524/588; 524/301; 524/430; 524/432; 524/433; 528/12; 528/14; 528/19; 528/33; 528/34
(58) Field of Search .............. 524/388, 301, 524/432, 433, 430; 528/12, 14, 19, 33, 34

(56) References Cited

U.S. PATENT DOCUMENTS

| | | | |
|---|---|---|---|
| 3,872,054 A | * 3/1975 | Shaw | 524/792 |
| 3,957,714 A | 5/1976 | Clark et al. | |
| 4,247,445 A | * 1/1981 | Smith et al. | 524/425 |
| 4,301,269 A | * 11/1981 | Hashimoto et al. | 528/34 |
| 4,672,004 A | * 6/1987 | Chizat et al. | 428/447 |
| 4,797,462 A | 1/1989 | Letoffe et al. | |
| 4,833,037 A | 5/1989 | Beers | |
| 5,086,107 A | 2/1992 | Arai et al. | |
| 5,264,515 A | 11/1993 | Cody et al. | |
| 5,319,050 A | 6/1994 | Kimura et al. | |
| 5,502,096 A | 3/1996 | Kimura et al. | |
| 5,547,000 A | * 8/1996 | Kemp et al. | 141/104 |
| 5,607,997 A | 3/1997 | Kimura et al. | |
| 5,948,853 A | 9/1999 | Bayly et al. | |
| 6,031,026 A | * 2/2000 | Tateyama et al. | 523/340 |
| 6,342,575 B1 | * 1/2002 | Miyake et al. | 528/34 |
| 6,444,740 B1 | * 9/2002 | DeCato et al. | 524/425 |

* cited by examiner

Primary Examiner—Jeffrey B Robertson
(74) Attorney, Agent, or Firm—Oblon, Spivak, McClelland, Maier & Neustadt, P.C.

(57) ABSTRACT

A room temperature organopolysiloxane composition is provided, which can be cured rapidly and right down to deep sections. The cured products have good rubber characteristics. The composition includes (A) 100 parts by weight of a diorganopolysiloxane represented by a general formula (1) shown below,

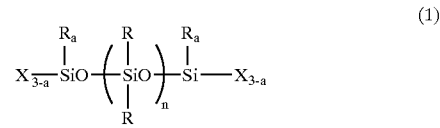

(1)

wherein R represents a substituted or unsubstituted monovalent hydrocarbon group, X represents, independently, an OH group, an alkoxy group or an acyloxy group, a represents an integer from 0 to 2, and n represents a number which results in a viscosity at 25° C. of 25 to 1,000,000 mm$^2$/s; (B) 2 to 50 parts by weight of a hydrolysable silane with at least two acyloxy groups, a partial hydrolysis-condensation product thereof, or a mixture thereof; and (C) 5 to 200 parts by weight of an inorganic filler capable of generating water through a reaction with a carboxylic acid generated by hydrolysis of the constituent (B).

22 Claims, No Drawings

ROOM TEMPERATURE RAPID CURING ORGANOPOLYSILOXANE COMPOSITION

BACKGROUND OF THE INVENTION

1. Field of the Invention

The present invention relates to a condensation curing type room temperature rapid curing organopolysiloxane composition which displays rapid curability and excellent curability of deep sections of the composition.

2. Description of the Prior Art

Conventional condensation curing type room temperature rapid curing organopolysiloxane compositions include single-pack type or one-pack type compositions using an organopolysiloxane terminated with hydroxyl groups at both molecular chain terminals as a base polymer, in which the rate of cross linking due to hydrolysis is increased by reducing the amount of cross linking agent to an absolute minimum, as well as two-pack type compositions in which a base polymer of an organopolysiloxane terminated with hydroxyl groups at both molecular chain terminals, and a cross linking agent are packaged separately.

However, although the aforementioned one-pack type compositions cure rapidly at the composition surface, a certain degree of time is required for deeper sections of the composition to cure, and consequently the compositions cannot really be termed rapid curing compositions. Furthermore, although the aforementioned two-pack type compositions display comparatively good curing of deep sections of the composition, handling is complex as the mixing ratio of the respective contents of the two packs is not 1:1, and the use of such compositions in automated mixing apparatus is also difficult. In addition, in order to ensure complete curing of the deep sections of the composition, either the total amount of hydroxyl groups at both terminals of the organopolysiloxane or polyoxyalkylene polymer and the amount of added cross linking agent need to be very carefully controlled, or additional water needs to be added to act as a curing agent for the deeper sections.

In contrast, an addition curing type organopolysiloxane composition enables a mixing ratio of the respective contents of the two packs of 1:1, and displays superior workability, but typically requires heating in order to achieve curing and adhesion. Furthermore, poisoning of the curing catalyst in the presence of addition poisons limits the operating environment.

Techniques for resolving the problems outlined above include the compositions disclosed in U.S. Pat. No. 5,319,050, in which 0.001 to 1 mol of an organic compound with at least one C=O group within each molecule, and 0.001 to 1 mol of an organic compound with at least one $NH_2$ group within each molecule, are added to a diorganopolysiloxane with a hydrolysable silyl group at both terminals of the molecular chain. The compositions are room temperature rapid curing organopolysiloxane compositions which utilize water produced as a by-product of a ketimine formation reaction of a C=O group and a $NH_2$ group. The inventors of the present invention have also confirmed that by using an organopolysiloxane with both terminals blocked with hydroxyl groups as the base polymer, an improvement in curability can be achieved over the case using a diorganopolysiloxane with a hydrolysable silyl group at both terminals of the molecular chain.

However, it has been found that these compositions using the ketimine formation reaction are not so sufficient in rapid curability and curability of deep sections as expected in the case where acetic acid-elimination reaction occurs in crosslinking of compositions.

Furthermore, a moisture curable composition is disclosed in U.S. Pat. No. 5,264,515 in which the curing agent is described as a mixture of zinc oxide and acid. However, no specific description is given of the composition.

SUMMARY OF THE INVENTION

In order to resolve the issues described above, an object of the present invention is to provide a room temperature rapid curing organopolysiloxane composition displays rapid curability at room temperature as well as excellent curability of deep sections of the composition, although it has an acetic acid-elimination type curing mechanism.

As a result of intensive investigation, the inventors of the present invention discovered that in a composition incorporating the constituents (A) to (C) described below, the presence of the constituent (B) and the constituent (C) produces a reaction between the constituent (C) and a carboxylic acid originating from the constituent (B) generated during hydrolysis, which yields water, and this water promotes rapid curing and the curing of deep sections of the composition. In other words, the inventors discovered that this composition not only cures in the presence of moisture in the air, but that this curing also results in the production of water within the composition, enabling the composition to undergo curing not only from the surface, but also from within the composition.

In other words, the present invention provides a room temperature rapid curing organopolysiloxane composition comprising:

(A) 100 parts by weight of a diorganopolysiloxane represented by a general formula (1) shown below,

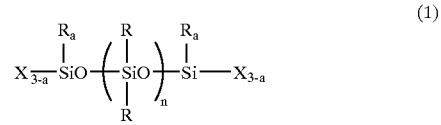

(1)

wherein, each R represents, independently, a substituted or unsubstituted monovalent hydrocarbon group, each X represents, independently, an OH group, an alkoxy group or an acyloxy group, a represents an integer from 0 to 2, and n represents a number which results in a viscosity at 25° C. of 25 to 1,000,000 $mm^2/s$;

(B) 2 to 50 parts by weight of either a hydrolysable silane with at least two acyloxy groups within each molecule, a partial hydrolysis-condensation product thereof, or a mixture thereof; and (C) 5 to 200 parts by weight of an inorganic filler capable of generating water through a reaction with a carboxylic acid generated by hydrolysis of the aforementioned constituent (B).

DETAILED DESCRIPTION OF THE PREFERRED EMBODIMENTS

As follows is a more detailed description of the present invention.

[Constituent (A)]

The constituent (A) is the base polymer of the composition, and forms a cured rubber elastic body on cross linking. The constituent (A) is a diorganopolysiloxane represented by the general formula (1) above, and may be either a single polysiloxane, or a mixture of two or more different polysiloxanes.

In the general formula (1), each R represents, independently, a substituted or unsubstituted monovalent hydrocarbon group. Specific examples of the R group include alkyl groups such as methyl groups, ethyl groups and propyl groups; cycloalkyl groups such as cyclohexyl groups; alkenyl groups such as vinyl groups and allyl groups; aryl groups such as phenyl groups and tolyl groups; and groups in which a portion of the hydrogen atoms of the aforementioned groups have been substituted with halogen atoms such as chloromethyl groups and 3,3,3-trifluoropropyl groups, although methyl groups are preferred.

In the general formula (1), X represents an OH group, an alkoxy group or an acyloxy group, and a represents an integer from 0 to 2, and in those cases in which X is an OH group, polymers in which a=2 are preferred, whereas in those cases in which X is an alkoxy group, polymers in which a=0,1 are preferred. Preferred alkoxy groups include methoxy groups and ethoxy groups, whereas acetoxy groups are the preferred acyloxy group.

Furthermore, the base polymer of the constituent (A) must have a viscosity at 25° C. between 25 and 1,000,000 $mm^2/s$, and in the general formula (1), the value of n must produce a viscosity within this range. If the viscosity is outside the above range, then it becomes very difficult to form a cured rubber product with satisfactory characteristics, and the workability of the composition also deteriorates. The viscosity should preferably be from 50 to 50,000 $mm^2/s$, and even more preferably from 100 to 20,000 $mm^2/s$. In addition, the degree of polymerization of the base polymer is typically at least 10, in order to ensure an organopolysiloxane with a viscosity which falls within the above viscosity range.

[Constituent (B)]

The constituent (B), either a hydrolysable silane with at least two acyloxy groups within each molecule, or a partial hydrolysis-condensation product thereof, functions as the cross linking agent for a composition of the present invention. The acyloxy groups should preferably be acetoxy groups. The acyloxy groups promote cross linking by reacting with the hydroxyl groups of the constituent (A) (including those hydroxyl groups produced by hydrolysis), and the product carboxylic acid then generates water by reacting with the constituent (C). This generated water further promotes hydrolysis, condensation and cross linking within the composition.

Specific examples of the hydrolysable silane with at least two acyloxy groups within each molecule of the constituent (B) include methyltriacetoxysilane, ethyltriacetoxysilane, phenyltriacetoxysilane, vinyltriacetoxysilane and tetracetoxysilane, although the constituent (B) is not restricted to these compounds. Partial hydrolysis-condensation products of these hydrolysable silanes may also be used as the constituent (B). The hydrolysable silanes and partial hydrolysis-condensation products thereof can be used as single compounds, or in combinations of two or more compounds.

The amount of the constituent (B) used is typically from 2 to 50 parts by weight, and preferably from 4 to 20 parts by weight per 100 parts by weight of the constituent (A). At amounts less than 2 parts by weight, preparation of the composition becomes difficult, whereas at amounts exceeding 50 parts by weight, the cured elastic body produced does not possess the desired physical properties.

[Constituent (C)]

There are no particular restrictions on the constituent (C), and any inorganic filler which reacts with the carboxylic acid generated during the hydrolysis reaction of the constituent (B) and generates water, which subsequently functions as a curing agent, right down to the deep sections of the composition can be used. Specific examples include metal oxides and metal carbonates, and preferred compounds include the oxides and carbonates of zinc, magnesium and calcium such as zinc oxide, magnesium oxide, calcium oxide, zinc carbonate, magnesium carbonate and calcium carbonate, with zinc oxide being particularly preferred. Furthermore, these fillers need not necessarily be used singularly, and combinations of two or more compounds may also be used. Furthermore, the surface of the filler may be either untreated, or hydrophobically treated with an organic acid, a silane, a siloxane or a silazane, or the filler may comprise a combination of surface treated and untreated compounds. The moisture content of the constituent (C) used should preferably be no more than 1.0% by weight, and the average particle diameter should preferably be no more than 10 $\mu$m.

The amount of the constituent (C) used is typically from 5 to 200 parts by weight, and preferably from 10 to 100 parts by weight per 100 parts by weight of the constituent (A). At amounts less than 5 parts by weight, satisfactory curing of the deep sections cannot be achieved, whereas at amounts exceeding 200 parts by weight, the cured elastic body produced does not possess the desired physical properties.

Furthermore, in order to further improve the rubber properties, a fumed silica should also preferably be incorporated within a composition of the present invention as an additional constituent (D). The amount of this fumed silica is typically from 2 to 50 parts by weight, and preferably from 5 to 20 parts by weight per 100 parts by weight of the constituent (A).

[Room Temperature Rapid Curing Composition]

A room temperature rapid curing composition of the present invention can be produced as a one-pack type composition by uniform mixing of predetermined quantities of the aforementioned constituents (A) to (C) in a dry atmosphere. The composition of the present invention can also be prepared as a two-pack type composition, for example, consisting of a first pack containing the constituent (A) and the constituent (B), and a second pack containing the constituent (A) and the constituent (C), with the contents of the two packs then being mixed at the time of use. In such a case, the respective contents of these two packs can be combined in a mixing ratio of 1:1.

Furthermore, a variety of other components may also be added to a composition of the present invention, provided such addition does not inhibit the rapid curing of the composition at room temperature or the curability of the deep sections. Other components which may be added in appropriate quantities include condensation catalysts such as organotin esters, organotin chelate complexes, organotitanate esters and organotitanium chelate complexes; reinforcing fillers such as fumed silica, precipitated silica, quartz powder, carbon powder, talc and bentonite; fibrous fillers such as asbestos, glass fiber, carbon fiber and organic fiber; coloring agents such as pigments and dyes; agents for improving the heat resistance such as red iron oxide, and cerium oxide; agents for improving cold resistance; rust-proofing agents; agents for improving adhesion such as di-t-butoxydiacetoxysilane; and liquid reinforcing agents such as polysiloxanes with a network-like structure composed of triorganosiloxy units and $SiO_2$ units.

A composition according to the present invention undergoes curing in the presence of moisture in the air, and this curing also results in the production of water within the composition, enabling the composition to undergo curing not only from the surface, but also from within the composition. Accordingly, the composition displays rapid curing as well as excellent curability of deep sections of the composition.

Furthermore, as described above, a composition of the present invention can be packaged as a two-pack type composition, with the two liquids being mixed together shortly before use, and the mixing ratio of the respective contents of the two packs can be easily adjusted to a ratio of 1:1, meaning the workability of the composition is good, and moreover, each of the constituents can also be readily obtained, meaning the composition is extremely practical.

The rapid curing and excellent curability of deep sections of compositions of the present invention make them highly suitable as materials for oil seals within motor vehicles, and such compositions can also be used to good effect as electrical and electronic sealing materials, a field in which process rationalization has been keenly sought in recent years, as well as for adhesives and potting materials.

EXAMPLES

As follows is a description of specifics of the present invention using a series of examples and comparative examples. However, the present invention is in no way limited to the examples presented. In the examples below, viscosity values refer to measurements conducted at 25° C.

Comparative Example 1

100 parts by weight of a dimethylpolysiloxane terminated with hydroxyl groups at both molecular chain terminals and with a viscosity of 5,000 mm$^2$/s, 5 parts by weight of methyltriacetoxysilane, 0.2 parts by weight of dibutyl tin dilaurate, and 8 g of fumed silica were mixed together in an anhydrous environment and yielded a curable silicone rubber composition.

A sheet of thickness 2 mm was produced using this composition, and subsequently converted to a rubber elastic body by leaving the sheet to cure for 24 hours in a 20° C., 55% RH atmosphere, and the properties of the rubber were then measured in accordance with JIS-K-6301. The results are shown in Table 1. In addition, the above composition was also injected into a glass dish of diameter 20 mm and depth 15 mm, and then cured by leaving to stand for 24 hours in a 20° C., 55% RH atmosphere. After 24 hours, the cured product was removed, and the thickness of the section which had cured into a rubber like elastic body was measured. The result is shown in Table 1.

Comparative Example 2

100 parts by weight of a dimethylpolysiloxane terminated with hydroxyl groups at both molecular chain terminals and with a viscosity of 5,000 mm$^2$/s, 5 parts by weight of methyltributanoximesilane, 10 parts by weight of zinc oxide, 0.2 parts by weight of dibutyl tin dilaurate, and 8 g of fumed silica were mixed together in an anhydrous environment and yielded a curable silicone rubber composition.

Using this composition, the rubber characteristics and the curing thickness were measured in the same manner as the comparative example 1. The results are shown in Table 1.

Example 1

100 parts by weight of a dimethylpolysiloxane terminated with hydroxyl groups at both molecular chain terminals and with a viscosity of 5,000 mm$^2$/s, 5 parts by weight of methyltriacetoxysilane, 10 parts by weight of zinc oxide 0.2 parts by weight of dibutyl tin dilaurate, and 8 g of fumed silica were mixed together in an anhydrous environment and yielded a curable silicone rubber composition.

Using this composition, the rubber characteristics and the curing thickness were measured in the same manner as the comparative example 1. The results are shown in Table 2.

Example 2

100 parts by weight of a dimethylpolysiloxane terminated with hydroxyl groups at both molecular chain terminals and with a viscosity of 5,000 mm$^2$/s, 5 parts by weight of methyltriacetoxysilane, 0.2 parts by weight of dibutyl tin dilaurate, 8 g of fumed silica, and 10 parts by weight of zinc carbonate were mixed together in an anhydrous environment and yielded a curable silicone rubber composition.

Using this composition, the rubber characteristics and the curing thickness were measured in the same manner as the comparative example 1. The results are shown in Table 2.

Example 3

100 parts by weight of a dimethylpolysiloxane terminated with hydroxyl groups at both molecular chain terminals and with a viscosity of 5,000 mm$^2$/s, 5 parts by weight of methyltriacetoxysilane, 0.2 parts by weight of dibutyl tin dilaurate, 8 g of fumed silica, and 50 parts by weight of calcium carbonate were mixed together in an anhydrous environment and yielded a curable silicone rubber composition.

Using this composition, the rubber characteristics and the curing thickness were measured in the same manner as the comparative example 1. The results are shown in Table 2.

Example 4

100 parts by weight of a dimethylpolysiloxane with both terminals of the molecular chain blocked with diacetoxysilyl groups and with a viscosity of 5,000 mm$^2$/s, 5 parts by weight of methyltriacetoxysilane, 10 parts by weight of zinc oxide, 0.2 parts by weight of dibutyl tin dilaurate, and 8 g of fumed silica were mixed together in an anhydrous environment and yielded a curable silicone rubber composition.

Using this composition, the rubber characteristics and the curing thickness were measured in the same manner as the comparative example 1. The results are shown in Table 2.

Example 5

100 parts by weight of a dimethylpolysiloxane with both terminals of the molecular chain blocked with trimethoxysilyl groups and with a viscosity of 5,000 mm$^2$/s, 5 parts by weight of methyltriacetoxysilane,
10 parts by weight of zinc oxide,
0.2 parts by weight of dibutyl tin dilaurate, and
8 g of fumed silica
were mixed together in an anhydrous environment and yielded a curable silicone rubber composition.

Using this composition, the rubber characteristics and the curing thickness were measured in the same manner as the comparative example 1. The results are shown in Table 2.

TABLE 1

|  | Comparative Example 1 | Comparative Example 2 |
|---|---|---|
| Hardness (Durometer A) | 20 | 15 |
| Elongation (%) | 320 | 300 |
| Tensile strength (MPa) | 1.5 | 0.9 |
| Curing thickness (mm) | 2.0 | 1.9 |

TABLE 2

|  | Example 1 | Example 2 | Example 3 | Example 4 | Example 5 |
|---|---|---|---|---|---|
| Hardness (Durometer A) | 30 | 25 | 22 | 30 | 20 |
| Elongation (%) | 350 | 300 | 320 | 340 | 290 |
| Tensile strength (MPa) | 2.9 | 2.5 | 2.2 | 2.5 | 2.0 |
| Curing thickness (mm) | 15 | 15 | 15 | 15 | 15 |

A room temperature rapid curing organopolysiloxane composition of the present invention can be cured rapidly and right down to deep sections of the composition, and the rubber characteristics of the cured product are also excellent.

What is claimed is:

1. A room temperature rapid curing organopolysiloxane composition comprising:
   (A) 100 parts by weight of a diorganopolysiloxane represented by a general formula (1) shown below,

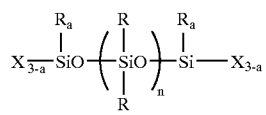

(1)

wherein, each R represents, independently, either one of a substituted and an unsubstituted monovalent hydrocarbon groups, each X represents, independently, any one of an OH group, an alkoxy group and an acyloxy group, a represents an integer from 0 to 2, and n represents a number which results in a viscosity at 25° C. of 25 to 1,000,000 mm²/s;
   (B) 2 to 50 parts by weight of a hydrolysable silane with at least two acyloxy groups within each molecule, a partial hydrolysis-condensation product thereof, or a mixture thereof; and
   (C) 5 to 200 parts by weight of an inorganic filler capable of generating water through a reaction with a carboxylic acid generated by hydrolysis of said constituent (B), wherein a moisture content of said constituent (C) is no more than 1.0% by weight.

2. A composition according to claim 1, wherein in said general formula (1) representing said constituent (A), R is any one of an alkyl group, a cycloalkyl group, an alkenyl group, an aryl group, and a group in which a portion of hydrogen atoms within said groups have been substituted with halogen atoms, and X is any one of an OH group, a methoxy group, an ethoxy group and an acetoxy group.

3. A composition according to claim 1, wherein in said general formula (1) representing said constituent (A), X is an OH group, and a=2.

4. A composition according to claim 1, wherein in said general formula (1) representing said constituent (A), a is either 0 or 1.

5. A composition according to claim 1, wherein said acyloxy groups within said constituent (B) are acetoxy groups.

6. A composition according to claim 1, wherein said constituent (B) is methyltriacetoxysilane, ethyltriacetoxysilane, phenyltriacetoxysilane, vinyltriacetoxysilane, tetraacetoxysilane, a partial hydrolysis-condensation product thereof or a mixture of two or more thereof.

7. A composition according to claim 1, wherein an average particle diameter of constituent (C) is no more than 10 μm.

8. A composition according to claim 1, wherein said inorganic filler of said constituent (C) is a metal oxide, a metal carbonate or a mixture thereof.

9. A composition according to claim 8, wherein said inorganic filler of said constituent (C) is an oxide or a carbonate of zinc, magnesium or calcium, or a mixture of two or more thereof.

10. A composition according to claim 1, wherein 4 to 20 parts by weight of said constituent (B) and 10 to 100 parts by weight of said constituent (C) are present, respectively, per 100 parts by weight of said constituent (A).

11. A composition according to claim 1, further comprising (D) 2 to 50 parts by weight of fumed silica per 100 parts by weight of the constituent (A).

12. A room temperature rapid curing organopolysiloxane composition comprising:
   (A) 100 parts by weight of a diorganopolysiloxane represented by a general formula (1) shown below,

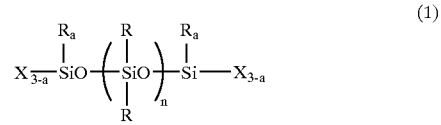

(1)

wherein, each R represents, independently, either one of a substituted and an unsubstituted monovalent hydrocarbon groups, each X is an alkoxy group or an acetoxy group and a is either one of 0 and 1, and n represents a number which results in a viscosity at 25° C. of 25 to 1,000,000 mm²/s;
   (B) 2 to 50 parts by weight of a hydrolysable silane with at least two acyloxy groups within each molecule, a partial hydrolysis-condensation product thereof, or a mixture thereof; and
   (C) 5 to 200 parts by weight of an inorganic filler capable of generating water through a reaction with a carboxylic acid generated by hydrolysis of said constituent (B).

13. A composition according to claim 12, wherein in said general formula (1) representing said constituent (A), R is any one of an alkyl group, a cycloalkyl group, an alkenyl group, an aryl group, and a group in which a portion of hydrogen atoms within said groups have been substituted with halogen atoms, and X is any one of a methoxy group, an ethoxy group and an acetoxy group.

14. A composition according to claim 12, further comprising (D) 2 to 50 parts by weight of fumed silica per 100 parts by weight of the constituent (A).

15. A composition according to claim 12, wherein in said general formula (1) representing said constituent (A), X is an alkoxy group, and a is either one of 0 or 1.

16. A composition according to claim 12, wherein said acyloxy groups within said constituent (B) are acetoxy groups.

17. A composition according to claim 12, wherein said constituent (B) is methyltriacetoxysilane, ethyltriacetoxysilane, phenyltriacetoxysilane, vinyltriacetoxysilane, tetraacetoxysilane, a partial hydrolysis-condensation product thereof, or a mixture of two or more thereof.

18. A composition according to claim 12, wherein a moisture content of said constituent (C) is no more than 1.0% by weight.

19. A composition according to claim 12, wherein an average particle diameter of said constituent (C) is no more than 10 μm.

20. A composition according to claim 12, wherein said inorganic filler of said constituent (C) is a metal oxide, a metal carbonate or a mixture thereof.

21. A composition according to claim 19, wherein said inorganic filler of said constituent (C) is an oxide or a carbonate of zinc, magnesium or calcium, or a mixture of one or more thereof.

22. A composition according to claim 12, wherein 4 to 20 parts by weight of said constituent (B) and 10 to 100 parts by weight of said constituent (C) are present, respectively, per 100 parts by weight of said constituent (A).

* * * * *